United States Patent [19]

Giovando

[11] Patent Number: 5,451,556
[45] Date of Patent: Sep. 19, 1995

[54] AMMONIUM SALT POLYMERIZATION COCATALYSTS

[75] Inventor: Gualtiero Giovando, Monforte d'Alba, Italy

[73] Assignees: Akzo Nobel N.V., Arnhem, Netherlands; Saint Peter S.r.l., Turin, Italy

[21] Appl. No.: 385,220

[22] Filed: Feb. 8, 1995

Related U.S. Application Data

[63] Continuation of Ser. No. 67,378, May 26, 1993, abandoned, which is a continuation-in-part of Ser. No. 768,265, Oct. 21, 1991, Pat. No. 5,235,010.

[30] Foreign Application Priority Data

Apr. 26, 1989 [IT] Italy ................................ 67301/89

[51] Int. Cl.⁶ ............................................. B01J 31/00
[52] U.S. Cl. ...................... 502/113; 502/114; 502/115; 502/117; 502/170; 502/171; 525/361; 525/366; 525/370
[58] Field of Search ................ 502/113, 114, 115, 117, 502/170, 171

[56] References Cited

U.S. PATENT DOCUMENTS

| | | | |
|---|---|---|---|
| 3,539,479 | 11/1970 | Alberts | 260/22 |
| 3,565,822 | 2/1971 | Bodycot | 252/429 |
| 3,663,599 | 5/1972 | Noshimura et al. | 260/475 P |
| 3,796,689 | 3/1974 | Bennett et al. | 260/47 ET |
| 3,900,504 | 8/1975 | Woerner | 424/294 |
| 4,020,180 | 4/1977 | Woerner | 424/294 |
| 4,119,568 | 10/1978 | Nishida et al. | 252/437 |
| 4,138,385 | 2/1979 | Uttner et al. | 260/40 R |
| 4,152,284 | 5/1979 | Morlock et al. | 252/182 |
| 4,175,064 | 11/1979 | Landau et al. | 260/22 CA |
| 4,446,246 | 5/1984 | McGinniss | 502/155 |

FOREIGN PATENT DOCUMENTS

| | | |
|---|---|---|
| 43484 | 1/1982 | European Pat. Off. . |
| 160621 | 11/1985 | European Pat. Off. . |
| 2429239 | 1/1980 | France . |
| 121524 | 8/1976 | Germany . |
| 2641108 | 9/1977 | Germany . |
| 3016051 | 4/1980 | Germany . |
| 833764 | 4/1960 | United Kingdom . |
| 881629 | 11/1961 | United Kingdom . |
| 1192166 | 5/1970 | United Kingdom . |

OTHER PUBLICATIONS

Abstract of Polymer Preprints, vol. 30, No. 2, pp. 575–576.
Derwent Abstract 33622 E/17 (of British Patent No. 2085464).
Derwent Abstract 46904 W/28 (of Japanese 50/032,284).
Derwent Abstract 87-105468/15 (of Japanese 62/053,330).

*Primary Examiner*—Bernard Lipman
*Attorney, Agent, or Firm*—Richard P. Fennelly; Louis A. Morris

[57] ABSTRACT

An accelerator composition for the curing of unsaturated maleic, allylic, vinylic and epoxy-type polyester resins is disclosed. The accelerator composition includes a complex of a salt of a metal selected from lithium, copper, manganese, magnesium, vanadium, iron and cobalt, with an ammonium salt of a $C_2$–$C_{20}$ carboxylic acid which is capable of forming a complex with the metal salt. Also disclosed are a curable resin composition including the foregoing accelerators and a curing process employing these accelerators.

6 Claims, No Drawings

AMMONIUM SALT POLYMERIZATION COCATALYSTS

This is a continuation of application Ser. No. 08/067,378 filed May 26, 1993 now abandoned, which is a continuation-in-part of U.S. Ser. No. 786,265, filed Oct. 21, 1991, now U.S. Pat. No. 5,235,010, dated Aug. 10, 1993.

The present invention relates to polymerization cocatalysts for the curing of unsaturated maleic, allylic, vinylic and epoxide-type polyesters. The cocatalysts comprise ammonium salts of carboxylic acids and a salt of at least one metal chosen from copper, lithium, vanadium, manganese, magnesium, cobalt and iron.

It is known to use lithium salts for the curing of unsaturated polyesters. For example, U.S. Pat. Nos. 3,539,479 and 3,663,599 disclose the use of lithium salts for the polymerization of unsaturated polyesters. The lithium salts include lithium decanoate, lithium thiocyanate, lithium acrylate, lithium methacrylate and lithium soaps of unsaturated and saturated aliphatic carboxylic acids.

British patent 2,085,464 suggests the use of cobalt, manganese or lithium naphthenate or cobalt or tin octanoate as hardening accelerators for the peroxide curing of unsaturated polyesters. Further, Japanese patent J5-0032-284 discloses the heat hardening of polyester resins in the presence of peroxides and acid cobalt salts, acetoacetate or ascorbic acid compounds.

"Melt Polymerization of Bisphenol A (BPA) Cyclic Polycarbonate Oligomers; Rheokinetics of Polymerization Relevant to Reactive Processing," Stewart, K. R., Polym. Prepr. 89; Vol. 30 (2); pp. 575–76, discloses the use of lithium salts or acetylacetonates as polymerization catalysts for the polymerization of cyclic polycarbonate oligomers with bisphenol A. Another example of phenolic-resin curing is given in JP-62-053330 wherein lithium acetylacetonate is employed as a hardening accelerator in the crosslinking of phenolic resins in the presence of spiro orthocarbonates.

U.S. Pat. No. 4,755,571 discloses a hardening composition for epoxy resins which comprises a peroxide free radical initiator and an accelerator. The accelerator may be, among others a quaternary ammonium salt.

East German patent DL-121524 contains a very broad disclosure of numerous possible accelerators for unsaturated polyesters, which accelerators contain nitrogenous electron donors and chelate forming groups. For example, among the numerous listed compounds are ammonia, primary, secondary and tertiary aliphatic, cycloaliphatic or aromatic amines, piperidine, piperazine, pyridine, indole and amines incorporated into unsaturated polyesters. The patent itself only exemplifies a very limited class of amines which are always used in combination with cobalt salts and optionally acetoacetonate.

German patent application DT 2641 108 discloses a high gloss epoxy resin acrylate polymer powder coating composition which contains a lithium salt and a quaternary ammonium compound as accelerators. The quarternary ammonium salts must contain a long alkyl group. U.S. Pat. No. 3,663,599 discloses the use of lithium salts in combination with a quaternary ammonium compound to promote the polymerization of vinyl monomers. These quarternary ammonium salts always contain at least one benzyl group i n the ammonium cation.

British patent application 1,192,166 discloses the use of ammonia, primary amines, secondary amines, hydrazine and ethers as electron donors for metal complexes which are used as polymerization initiators.

Finally, DE 30 16 051 discloses the use of a hardening accelerator for unsaturated resins which comprises a mixture of a ketimine and an (in)organic cupric or ferric compound in combination with a standard hardener.

In the field of curing accelerators/catalysts there exist very specialized requirements for each and every curing system. Thus, there remains a need for the development of new combinations of curing accelerators which exhibit specific advantageous properties and provide the ability to more completely control the parameters of the cure procedure.

It is therefore the object of the present invention to overcome one or more of these disadvantages by providing a novel curing accelerator for unsaturated allylic, maleic, vinylic and epoxidic polyesters, a curable composition of a resin and at least one curing accelerator and a process for curing these materials in the presence of this curing accelerator. These and other objects of the present invention will be apparent to one of ordinary skill in the art from the summary and detailed descriptions which follow.

SUMMARY

For the curing of unsaturated maleic, vinylic, allylic and epoxide-type polyesters, use as accelerators or cocatalysts is made of a salt of at least one metal chosen from among lithium, copper, magnesium, manganese, vanadium, iron, and cobalt, in combination with one or more compounds selected from ammonium salts of $C_2$–$C_{20}$ carboxylic acids that are capable of forming complexes with such metal salts. Also within the invention are a curable resin composition including these accelerators and a curing process employing these accelerators.

DESCRIPTION

The present invention refers generally to processes for the curing of unsaturated maleic, allylic, vinylic, and epoxide-type polyesters by means of radical or ionic-radical catalysis, and provides accelerators/promoters for the curing process.

Certain metal salts that can form complexes with ammonium salts of $C_2$–$C_{20}$ carboxylic acids are able to substantially accelerate the process of curing of the above-mentioned resins.

Salts of copper, lithium, magnesium, manganese, vanadium, cobalt and iron act as accelerators in the curing process in the presence of conventional peroxidic initiators in the presence of ammonium salts of $C_2$–$C_{20}$ carboxylic acids which are capable of forming complexes with these metals. The primary object of the invention is therefore, to provide an accelerator composition that comprises a complex of a salt of at least one metal chosen from among copper, lithium, magnesium, manganese, cobalt, vanadium and iron or combinations of these, with the ammonium salts of $C_2$–$C_{20}$ carboxylic acids.

It is considered that the metal salts are able to form a complex with the ammonium salts of $C_2$–$C_{20}$ carboxylic acids and consequently, the scope of the invention includes a composition comprising a complex of an ammonium salt of at least one $C_2$–$C_{20}$ carboxylic acid with a salt of at least one metal chosen from the above-mentioned group, as well as a curable resin composition including an accelerator and a process for curing unsaturated maleic, allylic, vinylic, and epoxy-type polyesters in the presence of at least one of these accelerators.

The complexes of the above-mentioned metals can be utilized as accelerators in combination with conventional initiators of the peroxide type in processes for curing unsaturated polyesters and such complexes can be employed along with known conventional accelerators and peroxidic initiators.

The salt employed for the formation of the metal complex is preferably a halide, nitrate, lactate, hexanoate or acetate. Chlorides are especially preferred. The same salt or mixtures of salts may be employed.

In the procedure for curing of the above-mentioned resins, which is a further subject of the present invention, the complex compound acting as the accelerator is typically employed in such a way as to furnish an amount of metal which comprises between 0.1 and 200 ppm on the basis of the weight of the resin. More specifically, the preferred concentrations on the basis of the weight of the resin are as follows:

Li, from 1 to 100 ppm,
Co, from 1 to 20 ppm,
Cu, from 0.1 to 10 ppm,
Fe, from 5 to 150 ppm,
Mg, from 3 to 200 ppm, and
V, Mn, from 1 to 200 ppm.

Combinations of two or more of these metals are employed advantageously in a single accelerator composition. A particularly preferred combination is copper with cobalt.

In the procedure of curing, the accelerators that are the subject of the present invention can be employed in the presence of conventional quantities of peroxidic initiators. More particularly, between 0.02 and 5.0% by weight of peroxide initiator, on the basis of the weight of the resin, are employed. These accelerators generally permit a reduction in the amount of peroxidic initiator that can be employed as compared with the same curing system in the absence of accelerator. Conventional peroxide initiators known for use with unsaturated polyesters may be used.

The curing procedure of the present invention comprises the addition, to a resin or prepolymer, of a peroxide initiator and at least one accelerator in accordance with the present invention. Conventional accelerators may also be present during the curing procedure of the present invention in addition to the accelerators of the present invention. Further, other materials including thiols and oxygen-containing compounds may be present during the curing process of the present invention.

Another aspect of the curing procedure of the present invention comprises the curing of a curable mixture of a resin or prepolymer chosen from among the group of unsaturated polyester resins, maleic, allylic, vinylic and epoxy-type resins, and at least one ethylenically unsaturated reactive monomer in the presence of an accelerator. Typical ethylenically unsaturated reactive monomers include styrene and styrene derivatives such as α-methylstyrene, indene, divinyl benzene, stilbene, dibenzalacetone, propenyl benzene and isopropenyl benzene; triallyl cyanurate, triallyl isocyanurate and mixtures thereof. The monomer may comprise from 0 to 50 wt. % of the material, based on the weight of the resin.

As ammonium salts capable of forming accelerator complexes according to the invention, are included ammonium salts of $C_2$-$C_{20}$ carboxylic acids that are capable of forming complexes with the metals employed in the accelerator. These ammonium salts correspond to the formula I:

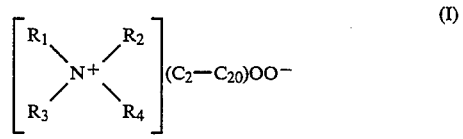

wherein $R_1$-$R_4$ are independently selected from hydrogen and $C_1$-$C_4$ alkyl. More preferred ammonium salts are ammonium acetate, ammonium butyrate, ammonium propionate and ammonium octoate. Most preferred among these materials is ammonium acetate.

The curable composition generally contains the amount of metal complex as specified earlier herein. The ammonium salt is generally employed in an amount of 0.01 to 20% by weight, and more preferably, 0.1 to 10% by weight, based on the weight of the resin.

Other materials including thiols and oxygen-containing compounds may be present during the curing process of the present invention.

The thiol compounds include mercaptans and more preferably materials containing at least two thiol groups, and their adducts with anhydrides or epoxides. More particularly, the preferred thiol compounds include dipentene dimercaptan, ethylcyclohexyl dimercaptan, ethylene-1,2-bis-3-mercaptoacetate, ethylene-1,2-bis-3-mercaptopropionate, 1,2,3-propanetrithiol, 1,2,6-hexanetrithiol, pentaerythritothiol, pentaerythritol tetramercaptoacetate, pentaerythritol tetramercaptopropionate, and thioesters of polyalcohols and sugars. A more detailed description of the thiol compounds and their adducts with epoxides and anhydrides can be found in applicants copending U.S. patent application Ser. No. 07/768,266 now U.S. Pat. No. 5,310,826 entitled, "Thiolic Compound Polymerization Cocatalysts."

The thiol materials may be added to the accelerator compositions of the present invention in amounts of from 0.1 to 0.74 by weight for non epoxy-type polyesters and from 1-150% by weight for epoxy-type polyesters, based on the weight of the resin. The nitrogen-containing compounds are generally used in amounts of 0.01% to 20% by weight, based on the weight of the resin.

The oxygenated compounds include oxygenated organic compounds carrying an aldehyde, ketone, ether, ester, or alcohol group on the molecule. The oxygen-containing compound must also be capable of forming a complex with the metal salt. Generally, the oxygen-containing compound enhances the known accelerating effect of the metal salt. Thus, sufficient oxygen-containing compound should be employed to enhance the accelerating effect.

In particular, the following can be employed as the oxygenated compound:

keto- and aldo-esters and ethers or alcohols, in particular methyl acetoacetate, ethyl acetoacetate, mono- and diesters of ketoglutaric acid, pyruvates, sugars such as glucose and fructose; and esters of ascorbic acid such as ascorbic palmitate;

1,3-diketones and aldehydes, in particular acetylacetone, benzoylacetone, and dibenzoylmethane;

mono- and diesters such as diethylmalonate and succinates;

1,2-diketones, in particular diacetyl and glyoxal; and certain polyalcohols and other alcohols such as diethylene glycol, benzyl alcohol and alcohols of the fatty series.

In the process of the present invention, the oxygen-containing compound may be employed in an amount of 0.002 to 0.3 weight percent on the basis of the resin. Specific materials, such as ethylene glycol and ascorbic palmitate are preferably employed in amounts of 0.01 to 0.2 and 0.02 to 1 weight percent on the basis of the resin, respectively.

Another aspect of the curing procedure of the present invention comprises the curing of a curable mixture of a resin or prepolymer chosen from among the group of unsaturated polyester resins, maleic, allylic, vinylic and epoxy-type resins, and at least one ethylenically unsaturated reactive monomer in the presence of an accelerator. Typical ethylenically unsaturated reactive monomers include styrene and styrene derivatives such as α-methylstyrene, indene, divinyl benzene, stilbene, dibenzalacetone, propenyl benzene and isopropenyl benzene; triallyl cyanurate, triallyl isocyanurate and mixtures thereof. The monomer may comprise from 0 to 50 wt.% of the material, based on the weight of the resin.

In the curing process of the present invention, one begins with the resin composition. To this there may optionally be added an ethylenically unsaturated reactive monomer. The accelerator composition may be added in several different manners. For example, the accelerator composition may be pre-mixed to form the metal salt complex prior to it being added to the resin composition. Another possibility is to add the individual components of the accelerator composition to the resin and form the metal complex in situ. Which of these methods is preferred will depend on the specific curing process being carried out.

Other additives, such as the peroxide initiator, or other accelerator enhancing materials may be added directly to the resin without first mixing them with the accelerator composition. However, in some cases it may be desirable to premix the accelerator enhancing materials with one or more of the accelerator components prior to introduction to the resin composition.

The curing process of the present invention may be carried out at any temperature from room temperature up to 250° C., depending on the initiator system, accelerator system and resin being cured. Other standard additives may also be employed including conventional accelerators.

The accelerators and process of the present invention will be further illustrated by the examples appended hereto.

EXAMPLE 1

Polymerization tests using the DSM NX 530 polyester resin (100 g) were effectuated with the use of accelerators consisting of a complex of a copper salt with 1% by weight of ammonium acetate. A peroxidic initiator was employed consisting of 754 methylethylketone peroxide in dibutylphthalate, added to the resin in 2% weight ratio. The time to final gelation was 9 minutes and the time from final gelation to the exothermal peak was 11 minutes. The yield of cross-linking after 24 hours was 984%.

EXAMPLE 2

An accelerator was prepared by mixing in a 1:1 ratio a 10% solution of cobalt acetate with a 25% solution of ammonium acetate. 0.25% by weight of the thus obtained accelerator was added to 100 g of DSM NX 530 resin. The results are given in Table 1.

EXAMPLES 3 and 4

In Example 3 an accelerator analagous to that of Example 2 was prepared, but with the cobalt acetate being replaced by a 10% solution of iron acetate. In Example 4 the accelerator was a mixture of 1 part of 25% ammonium acetate solution and 1 part, by weight, of a mixture of the acetates of cobalt, copper and lithium. The results of these polymerizations are reported in Table 1.

TABLE I

Resin DSM NX 530
Initiator: 1:1 mixture of methylethylketone peroxide and acetylacetone peroxide

| Accelerator | Example 2 | Example 3 | Example 4 |
| --- | --- | --- | --- |
| Time of final gelation (min) | 5 | 15 | 7 |
| Time from final gelation to exothermal peak (min) | 5 | 17 | 6 |
| Temperature at exothermal peak (°C.) | 130 | 107 | 122 |
| Yield of cross-linking after 24 hours | 99% | 96% | 98% |
| Quantity of initiator (wt %) | 2% | 2% | 2% |

EXAMPLE 5

"Beta" accelerator

This accelerator was obtained by mixing 7 g of ammonium acetate with 6 g of cresyldiglycidylether, 12 g ascorbic palmitate, and 7 g of ethyleneglycol and heating at 80° C. for 1 hour. Separately, a mixture of 11 g ethyl acetoacetate and 14 g methylnadic anhydride was prepared and heated to 80° C. for 1 hour. The thus obtained products were mixed with the further addition of 0.15 g copper sulphate and 14.85 g diethyleneglycol.

EXAMPLE 6

A polymerization test was carried out using the accelerator of Example 5 on DSM NX 530 unsaturated polyester resin. 2% by weight of peroxidic initiator (75% methylethylketone peroxide in dibutylphthalate) was employed. The test was done in a thermostatted bath at 25° C. 0.5% by weight of the Beta accelerator was employed. The time from final gelation to exothermal peak was 12 minutes and the exothermal peak was 131° C. A greenish-brown polymer was obtained.

EXAMPLE 7

A polymerization test was carried out on 25 g of Ludopal ® P6 with 2% methyl ethyl ketone peroxide and 0.25% of an accelerator comprising 50% by weight of ammonium octoate, 0.5% by weight of copper acetate, 16% by weight of cobalt acetate and 34% by weight of white spirit. The test was done in a thermostatted bath at 20° C. The product gave a gel time of 9 minutes, a time from final gelation to exothermal peak of 16 minutes and a peak exotherm of 148° C.

EXAMPLE 8

A polymerization test was carried out using 100 parts by weight of Ludopal ® P6 with 2 parts of methyl ethyl ketone peroxide and one part of an accelerator comprising 41 parts potassium octoate, 29 parts butyldioxitol, 16.5 parts cobalt acetate, 1 part copper acetate and 12.5 parts of ammonium acetate and which is further diluted with 25 additional parts of butyldioxitol. The test was done in a thermostatted bath at 20° C. The product gave a gel time of 6 minutes, a time from final gelation to exothermal peak of 12 minutes and a clear resin.

The foregoing detailed description and examples of the invention have been presented for the purposes of illustration and description only and are not to be construed as limiting the invention in any way. The scope of the invention is to be determined from the claims appended hereto.

What claimed is:

1. An accelerator composition which consists essentially of a complex of salts of at least two metals selected from the group consisting of lithium, copper, manganese, magnesium, vanadium, iron and cobalt, and a compound selected from the group consisting of ammonium salts of $C_2$–$C_{20}$ carboxylic acids represented by the formula I:

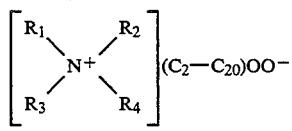

wherein, $R_1$–$R_4$ are independently selected from hydrogen and $C_1$–$C_4$ alkyl.

2. An accelerator composition as claimed in claim 1 wherein said ammonium salt is selected from ammonium acetate, ammonium propionate, ammonium butyrate and ammonium octoate.

3. An accelerator composition as claimed in claim 1 wherein said metal salts are selected from the group consisting of halides, nitrates and acetates.

4. An accelerator composition as claimed in claim 1 which further comprises a sufficient amount of an oxygenated organic compound which includes at least one functional group selected from the group consisting of aldehyde, ketone, ether, ester, or alcohol to enhance the accelerative effect of said nitrogen-containing accelerator composition.

5. An accelerator composition as claimed in claim 4 wherein said oxygenated compound is selected from the group consisting of ethylacetoacetate, mono-and diesters of ketoglutaric acid, esters of pyruvic acid, glucose, fructose, acetylacetone, benzoylacetone, dibenzoylmethane, diethylmalonate, succinates, diacetyl, glyoxal, diethyleneglycol, benzylglycol and ascorbic palmitate.

6. An accelerator composition as claimed in claim 1 which further comprises a sufficient amount of a thiol group-containing compound to enhance the accelerative effect of said accelerator composition.

* * * * *